US012760242B2

(12) United States Patent
Allison

(10) Patent No.: US 12,760,242 B2
(45) **Date of Patent: *Oct. 13, 2026**

(54) WAX FORMULATIONS HAVING IMPROVED RELEASE CHARACTERISTICS

(71) Applicant: FIRMENICH SA, Satigny (CH)

(72) Inventor: Gerald Allison, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 44 days.

This patent is subject to a terminal disclaimer.

(21) Appl. No.: 18/748,388

(22) Filed: Jun. 20, 2024

(65) Prior Publication Data

US 2024/0336870 A1 Oct. 10, 2024

Related U.S. Application Data

(63) Continuation of application No. 16/619,996, filed as application No. PCT/EP2018/064729 on Jun. 5, 2018, now Pat. No. 12,037,564.

(60) Provisional application No. 62/515,914, filed on Jun. 6, 2017.

(30) Foreign Application Priority Data

Oct. 25, 2017 (EP) .................................... 17198363

(51) Int. Cl.
*C11C 5/00* (2006.01)
*C11C 5/02* (2006.01)

(52) U.S. Cl.
CPC ................ *C11C 5/002* (2013.01); *C11C 5/02* (2013.01)

(58) Field of Classification Search
CPC ............ C11C 5/002; C11C 5/02; C11C 5/023
See application file for complete search history.

(56) References Cited

U.S. PATENT DOCUMENTS

| | | | | |
|---|---|---|---|---|
| 5,597,300 | A | 1/1997 | Wohl et al. | |
| 2001/0034965 | A1 * | 11/2001 | Noda | C11C 5/002 44/275 |
| 2005/0229815 | A1 * | 10/2005 | Moussouni | C08L 91/06 106/272 |
| 2010/0212214 | A1 | 8/2010 | Wu et al. | |

FOREIGN PATENT DOCUMENTS

| | | | | |
|---|---|---|---|---|
| EP | 1776868 | A1 | 4/2007 | |
| EP | 2845895 | A1 * | 3/2015 | C08F 18/14 |
| JP | 2005060615 | A | 3/2005 | |
| JP | 2013033695 | A | 2/2013 | |
| WO | 0183656 | A1 | 11/2001 | |
| WO | 03057810 | A1 | 7/2003 | |
| WO | 2004044112 | A1 | 5/2004 | |

OTHER PUBLICATIONS

Pattnaik et al., "Optimization of the Investment Casting Process Using Genetic Algorithm", Computational Intelligence in Data Mining, Published 2014, vol. 2, pp. 201-208.
Thomas Scientific, Database WPI Week 199838, XP-002779895, Published 1998, 1 page.
International Search Report and Written Opinion for International Application No. PCT/EP2018/064729, dated Aug. 6, 2018, 12 pages.

* cited by examiner

*Primary Examiner* — Cephia D Toomer

(57) ABSTRACT

The aspects presented herein provide wax formulations and candles having improved release characteristics from containers.

8 Claims, 4 Drawing Sheets

WAX FORMULATIONS HAVING IMPROVED RELEASE CHARACTERISTICS

CROSS REFERENCE TO RELATED APPLICATIONS

The present application is a continuation of U.S. application Ser. No. 16/619,996, filed Dec. 6, 2019, which claims the benefit of priority to U.S. Provisional Patent Application Ser. No. 62/515,914, filed on Jun. 6, 2017, and European Patent Application Serial No. 17198363.8, filed on Oct. 25, 2017. The entire contents of these applications are explicitly incorporated herein by this reference.

FIELD

The various aspects presented herein relate to wax formulations and candles having improved release characteristics from containers.

BACKGROUND

The after burn residue of wax formulations configured to be used in containers, such as, for example, formulations for votive candles, are frequently difficult to remove from the container, where removal of the burn residue may not be possible, or may result in injury to the user. Consequently, there is a need to formulate a wax to allow the easier removal of the after burn residue from containers.

SUMMARY

One aspect presented herein, provides a wax formulation comprising:

a) a paraffin wax;
b) a stearic acid;
c) a polyethylene;
d) at least one microcrystalline wax;
e) at least one linear alcohol; and
f) a volatile active substance.

In one aspect, the paraffin is present in an amount from 50% to 95% by weight of the wax formulation.

In one aspect, the stearic acid is present in an amount from 5% to 20% by weight of the wax formulation.

In one aspect, the at least one linear alcohol is present in an amount from 0.1% to 0.6% w/w of the wax formulation.

In one aspect, the polyethylene is present in an amount from 0.05% to 5% by weight of the wax formulation.

In one aspect, the at least one microcrystalline wax is present in an amount from 0.1% to 5% by weight of the wax formulation.

One aspect presented herein, provides a candle comprising the wax formulation according to certain aspects provided herein.

In one aspect, provides a vessel containing at least one candle comprising the wax formulation according to certain aspects provided herein.

In one aspect, the wax formulation is solid at room temperature, and a portion of the wax formulation undergoes a phase change from solid to liquid when the at least one candle is burnt, and the temperature of the at least one candle increases above the melting point of the wax formulation, wherein the portion of the wax formulation that is liquid, undergoes a phase change from liquid to solid when the at least one candle cools below the melting point of the wax formulation after the burning stops, wherein either the at least one microcrystalline wax, or the polyethylene, or both the at least one microcrystalline wax and the polyethylene is present in the wax formulation in an amount sufficient to enable the wax formulation to pull away from an inner surface of the vessel when the candle cools below the melting point of the wax formulation after the burning stops.

In one aspect, the polyethylene is present in the wax formulation in an amount sufficient to enable the wax formulation to pull away from an inner surface of the vessel when the candle cools below the melting point of the formulation after the burning stops.

In one aspect, the at least one microcrystalline wax is present in the formulation in an amount sufficient to enable the wax formulation to pull away from an inner surface of the vessel when the candle cools below the melting point of the wax formulation after the burning stops.

In one aspect, the sufficient amount of the polyethylene is from 0.05% to 5% by weight of the wax formulation.

In one aspect, the sufficient amount of the at least one microcrystalline wax is from 0.1% to 5% by weight of the wax formulation.

One aspect presented herein, provides a method comprising:

a) admixing a paraffin wax, a stearic acid, a polyethylene, at least one microcrystalline wax, at least one linear alcohol, and a volatile active substance, thereby forming a wax formulation; and
b) forming a candle from the wax formulation,
   wherein the polyethylene is present in the wax formulation in an amount sufficient to enable the wax formulation to pull away from an inner surface of the vessel when the candle cools below the melting point of the wax formulation after the burning stops, and
   wherein the at least one microcrystalline wax is present in the wax formulation in an amount sufficient to enable the wax formulation to pull away from an inner surface of the vessel when the candle cools below the melting point of the wax formulation after the burning stops.

In one aspect, the sufficient amount of the polyethylene is from 0.05% to 5% by weight of the wax formulation.

In one aspect, the sufficient amount of the at least one microcrystalline wax is from 0.1% to 5% by weight of the wax formulation.

DETAILED DESCRIPTION

In the following description, reference is made to specific embodiments which may be practiced, which is shown by way of illustration. These embodiments are described in detail to enable those skilled in the art to practice the invention described herein, and it is to be understood that other embodiments may be utilized and that logical changes may be made without departing from the scope of the aspects presented herein. The following description of example embodiments is, therefore, not to be taken in a limited sense, and the scope of the various aspects presented herein is defined by the appended claims.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The after burn residue of wax formulations configured to be used in containers, such as, for example, formulations for votive candles, are frequently difficult to remove from the container, where removal of the burn residue may not be possible, or may result in injury to the user. Consequently, there is a need provide wax formulations that allow the easier removal of the after burn residue from containers.

The National Candle Association states that a major safety hazard are injuries sustained when consumers remove the "spent wax remains" from vessels containing the burnt wax formulation. Consumer may use sharp objects to pry the after burn residue, which may result in injury or breakage of the vessel.

Without intending to be limited to any particular theory, the difficulty in removing the after burn residue is due, in part, to the adherence of the wax formulation to the vessel walls. In some instances, the adherence may increase at the later stages of a candle burn cycle. An increased adherence results in a decrease in the contraction of the wax formulation, limiting the extent by which the wax formulation may pull away from the vessel wall.

Figure 1:
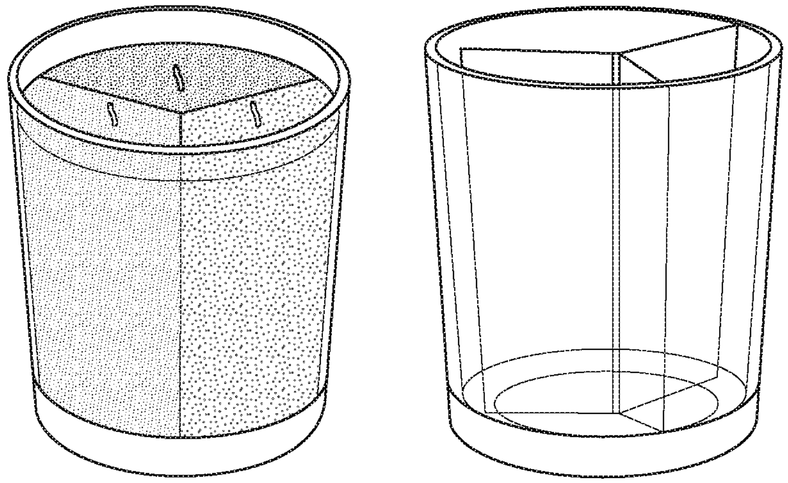
FIG. 1 shows an exemplar candle made using a formulation according to certain aspects presented herein.
Figure 2:
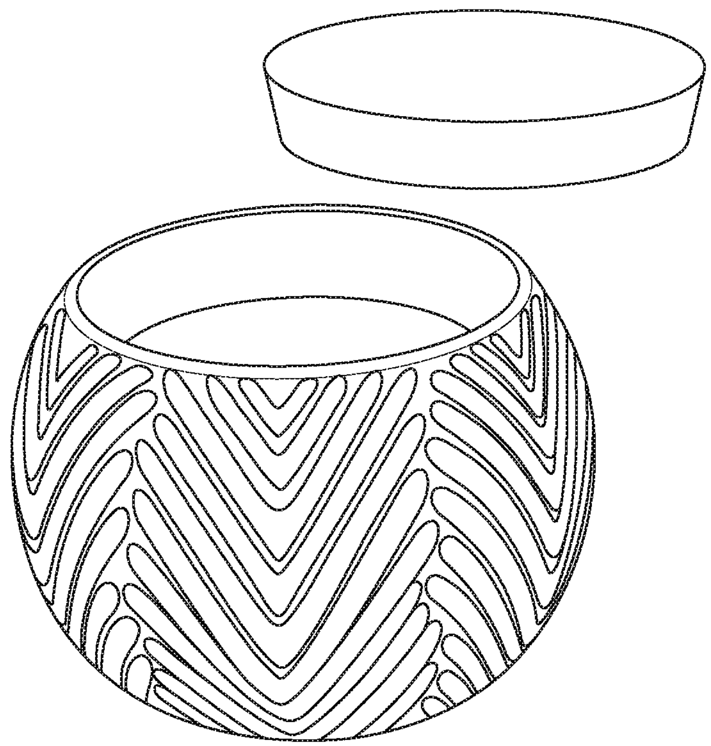
FIG. 2 shows an exemplar candle made using a formulation according to certain aspects presented herein.
Figure 3:
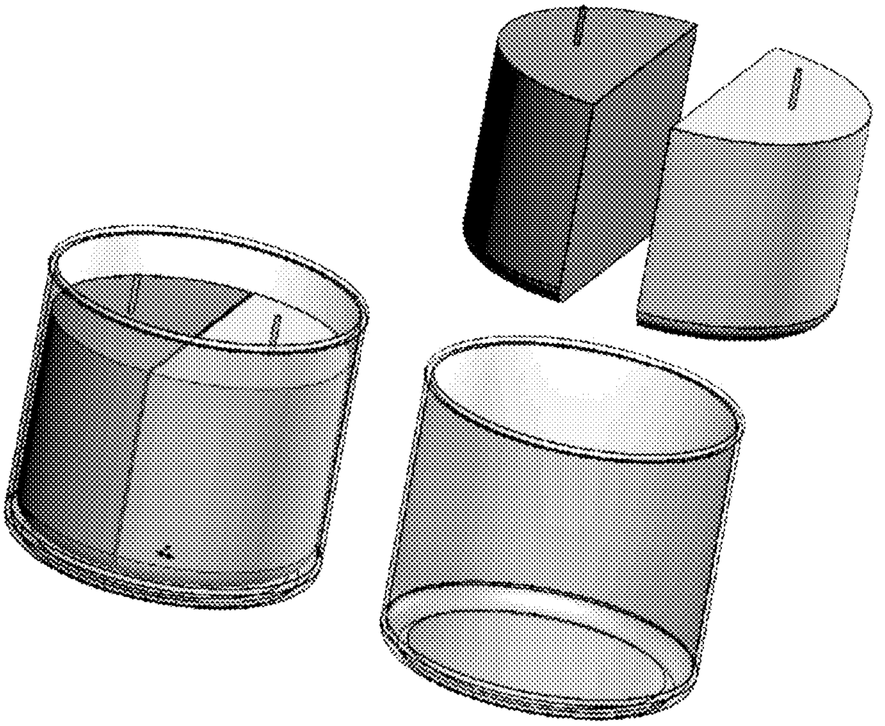
FIG. 3 shows an exemplar candle made using a formulation according to certain aspects presented herein.
Figure 4:
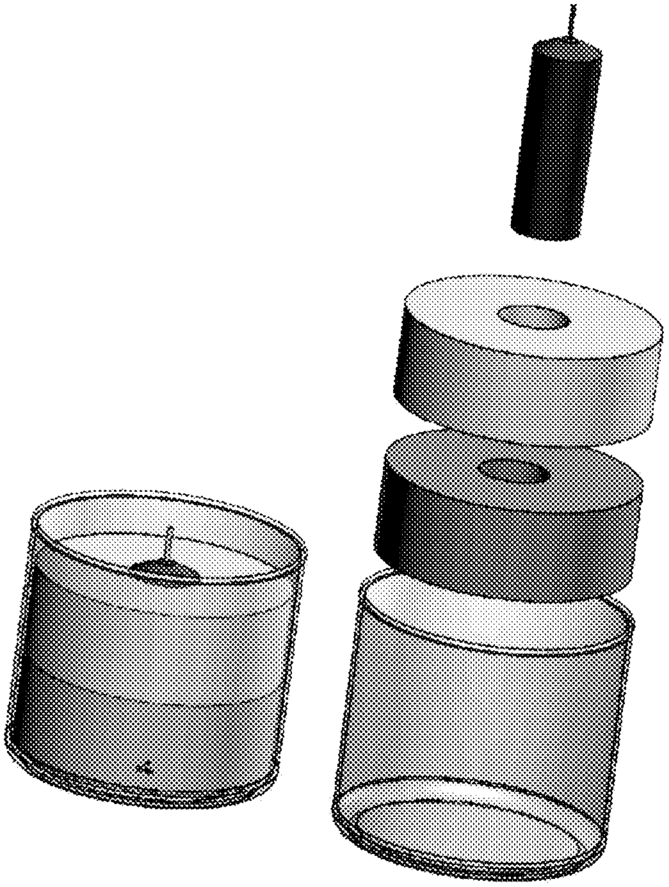
FIG. 4 shows an exemplar candle made using a formulation according to certain aspects presented herein.

Without intending to be limited to any particular theory, the wax formulations according to some aspects presented herein are configured to form a candle matrix that is easily removable from a vessel. For example, in some aspects, the wax formulation comprises a filled vessel containing at least one wax formulation, having a particular scent and/or color. In some aspects, the wax formulation comprises a candle configured to be inserted into the vessel, once the original wax formulation is removed. Non limiting examples of such aspects are shown in FIGS. 1-4.

Without intending to be limited to any particular theory, the wax formulations according to some aspects of the present invention are configured to provide a contractility and/or surface tension sufficient to allow the wax formulation to pull away from the inner surface of a vessel.

As used herein, the term "wax" refers to a substance that is a plastic to brittle solid at ambient temperatures. Suitable waxes for certain aspects presented herein include, but are not limited to, paraffin wax, microcrystalline wax, beeswax, animal wax, vegetable wax, mineral wax, synthetic wax, and mixtures thereof. In addition to wax semi-solids (such as petrolatum), liquids, synthetic polymers and mixtures of synthetic polymers with one or more organic compounds may be used in a candle material or part of a candle material. Other typically used candle fuel source components such as hydrocarbon oil, stearic acid, may also be included in the candle material.

In some aspects, the ability of the wax formulation to pull away from the inner surfaces of the surfaces of the vessel may be influenced by factors such as, for example, the recrystallization time of the wax formulation during the phase change from liquid to solid, the specific gravity of the wax formulation, the composition of the wax formulation, the density of the wax formulation, the coefficient of expansion of the wax formulation, the surface tension of the wax formulation, the nature and extent of inter-molecular interactions between the wax formulation and the inner surface of the vessel, and the like.

In some aspects, the wax formulation contains paraffin wax. Without intending to be limited to any particular theory, paraffin wax has a reduced soot accumulation and carbon deposits, and acceptable ability to retain volatile active substances. Paraffin wax has a low coefficient of thermal expansion, allowing minimal volume changes throughout the heat and cooling phase of the wax formulation. The coefficient of thermal expansion is defined as the changes in volume of a material per one degree Celsius change in temperature.

Consequently, in some aspects, the volume changes throughout the heat and cooling phase of the wax formulation of the wax formulation are altered, sufficient to enable the wax formulation to pull away from an inner surface of the vessel when the wax formulation cools below the melting point of the formulation after the burning stops.

Accordingly, some aspects presented herein, provide a wax formulation comprising:

a) a paraffin wax;
b) a stearic acid;
c) a polyethylene;
d) at least one microcrystalline wax;
e) at least one linear alcohol; and
f) a volatile active substance.

In some aspects, the paraffin is present in an amount from 50% to 95% by weight of the wax formulation. In some aspects, the paraffin is present in an amount from 50% to 90% by weight of the wax formulation. In some aspects, the paraffin is present in an amount from 50% to 85% by weight of the wax formulation. In some aspects, the paraffin is present in an amount from 50% to 80% by weight of the wax formulation. In some aspects, the paraffin is present in an amount from 50% to 75% by weight of the wax formulation. In some aspects, the paraffin is present in an amount from 50% to 70% by weight of the wax formulation. In some aspects, the paraffin is present in an amount from 50% to 65% by weight of the wax formulation. In some aspects, the paraffin is present in an amount from 50% to 60% by weight of the wax formulation. In some aspects, the paraffin is present in an amount from 50% to 55% by weight of the wax formulation. In some aspects, the paraffin is present in an amount from 55% to 95% by weight of the wax formulation. In some aspects, the paraffin is present in an amount from 60% to 95% by weight of the wax formulation. In some aspects, the paraffin is present in an amount from 65% to 95% by weight of the wax formulation. In some aspects, the paraffin is present in an amount from 70% to 95% by weight of the wax formulation. In some aspects, the paraffin is present in an amount from 75% to 95% by weight of the wax formulation. In some aspects, the paraffin is present in an amount from 80% to 95% by weight of the wax formulation. In some aspects, the paraffin is present in an amount from 85% to 95% by weight of the wax formulation. In some aspects, the paraffin is present in an amount from 90% to 95% by weight of the wax formulation.

In some aspects, the paraffin is present in an amount from 55% to 95% by weight of the wax formulation. In some aspects, the paraffin is present in an amount from 60% to 95% by weight of the wax formulation. In some aspects, the paraffin is present in an amount from 65% to 95% by weight of the wax formulation. In some aspects, the paraffin is present in an amount from 70% to 95% by weight of the wax formulation. In some aspects, the paraffin is present in an amount from 75% to 95% by weight of the wax formulation. In some aspects, the paraffin is present in an amount from 80% to 95% by weight of the wax formulation. In some aspects, the paraffin is present in an amount from 85% to 95% by weight of the wax formulation. In some aspects, the paraffin is present in an amount from 90% to 95% by weight of the wax formulation.

In some aspects, the paraffin is present at 50, or 55, or 60, or 65, or 70, or 75, or 80, or 85, or 90, or 95% by weight of the wax formulation.

In some aspects, the stearic acid is present in an amount from 5% to 20% by weight of the formulation. In some aspects, the stearic acid is present in an amount from 5% to 15% by weight of the formulation. In some aspects, the stearic acid is present in an amount from 5% to 10% by weight of the formulation. In some aspects, the stearic acid is present in an amount from 10% to 20% by weight of the formulation. In some aspects, the stearic acid is present in an amount from 15% to 20% by weight of the formulation.

In some aspects, the stearic acid is present in an amount from 10% to 20% by weight of the formulation. In some aspects, the stearic acid is present in an amount from 15% to 20% by weight of the formulation.

In some aspects, the stearic acid is present at 5, or 10, or 15, or 20% by weight of the formulation.

The stearic acid can be derived from either vegetable and or animal sources. In some aspects, the stearic acid is extracted from crude palm oil. In some aspects, the crude palm oil is fractionated into stearine/palm oil. In some aspects, the stearine/palm oil may distilled into fatty acid mixtures of $C_{16-18}$ fatty acids, also referred to as triple pressed stearic acid. In some aspects, the ratio of palmitic acid to stearic acids are 60/40.

In some aspects, the wax formulation is solid at room temperature, and a portion of the formulation undergoes a phase change from solid to liquid when the wax formulation is burnt, and the temperature of the wax formulation increases above the melting point of the wax formulation, wherein the portion of the wax formulation that is liquid, undergoes a phase change from liquid to solid when the wax formulation cools below the melting point of the wax formulation after the burning stops, wherein either the at least one microcrystalline wax is present in the formulation in an amount sufficient to enable the wax formulation to pull away from an inner surface of the vessel when the wax formulation cools below the melting point of the formulation after the burning stops.

In some aspects, the polyethylene is present in the wax formulation in an amount sufficient to enable the wax formulation to pull away from an inner surface of the vessel when the wax formulation cools below the melting point of the formulation after the burning stops.

In some aspects, the polyethylene is present in an amount from 0.05% to 5% by weight of the formulation. In some aspects, the polyethylene is present in an amount from 0.05% to 4.95% by weight of the formulation. In some aspects, the polyethylene is present in an amount from 0.05% to 4.90% by weight of the formulation. In some aspects, the polyethylene is present in an amount from 0.05% to 4.85% by weight of the formulation. In some aspects, the polyethylene is present in an amount from 0.05% to 4.80% by weight of the formulation. In some aspects, the polyethylene is present in an amount from 0.05% to 4.75% by weight of the formulation. In some aspects, the polyethylene is present in an amount from 0.05% to 4.70% by weight of the formulation. In some aspects, the polyethylene is present in an amount from 0.05% to 4.65% by weight of the formulation. In some aspects, the polyethylene is present in an amount from 0.05% to 4.60% by weight of the formulation. In some aspects, the polyethylene is present in an amount from 0.05% to 4.55% by weight of the formulation. In some aspects, the polyethylene is present in an amount from 0.05% to 4.50% by weight of the formulation. In some aspects, the polyethylene is present in an amount from 0.05% to 4.45% by weight of the formulation. In some aspects, the polyethylene is present in an amount from 0.05% to 4.40% by weight of the formulation. In some aspects, the polyethylene is present in an amount from 0.05% to 4.35% by weight of the formulation. In some aspects, the polyethylene is present in an amount from 0.05% to 4.30% by weight of the formulation. In some aspects, the polyethylene is present in an amount from 0.05% to 4.25% by weight of the formulation. In some aspects, the polyethylene is present in an amount from 0.05% to 4.20% by weight of the formulation. In some aspects, the polyethylene is present in an amount from 0.05% to 4.15% by weight of the formulation. In some aspects, the polyethylene is present in an amount from 0.05% to 4.10% by weight of the formulation. In some aspects, the polyethylene is present in an amount from 0.05% to 4.05% by weight of the formulation. In some aspects, the polyethylene is present in an amount from 0.05% to 4% by weight of the formulation. In some aspects, the polyethylene is present in an amount from 0.05% to 3.95% by weight of the formulation. In some aspects, the polyethylene is present in an amount from 0.05% to 3.90% by weight of the formulation. In some aspects, the polyethylene is present in an amount from 0.05% to 3.85% by weight of the formulation. In some aspects, the polyethylene is present in an amount from 0.05% to 3.80% by weight of the formulation. In some aspects, the polyethylene is present in an amount from 0.05% to 3.75% by weight of the formulation. In some aspects, the polyethylene is present in an amount from 0.05% to 3.70% by weight of the formulation. In some aspects, the polyethylene is present in an amount from 0.05% to 3.65% by weight of the formulation. In some aspects, the polyethylene is present in an amount from 0.05% to 3.60% by weight of the formulation. In some aspects, the polyethylene is present in an amount from 0.05% to 3.55% by weight of the formulation. In some aspects, the polyethylene is present in an amount from 0.05% to 3.50% by weight of the formulation. In some aspects, the polyethylene is present in an amount from 0.05% to 3.45% by weight of the formulation. In some aspects, the polyethylene is present in an amount from 0.05% to 3.40% by weight of the formulation. In some aspects, the polyethylene is present in an amount from 0.05% to 3.35% by weight of the formulation. In some aspects, the polyethylene is present in an amount from 0.05% to 3.30% by weight of the formulation. In some aspects, the polyethylene is present in an amount from 0.05% to 3.25% by weight of the formulation. In some aspects, the polyethylene is present in an amount from 0.05% to 3.20% by weight of the formulation. In some aspects, the polyethylene is present in an amount from 0.05% to 3.15% by weight of the formulation. In some aspects, the polyethylene is present in an amount from 0.05% to 3.10% by weight of the formulation. In some aspects, the polyethylene is present in an amount from 0.05% to 3.05% by weight of the formulation. In some aspects, the polyethylene is present in an amount from 0.05% to 3% by weight of the formulation. In some aspects, the polyethylene is present in an amount from 0.05% to 2.95% by weight of the formulation. In some aspects, the polyethylene is present in an amount from 0.05% to 2.90% by weight of the formulation. In some aspects, the polyethylene is present in an amount from 0.05% to 2.85% by weight of the formulation. In some aspects, the polyethylene is present in an amount from 0.05% to 2.80% by weight of the formulation. In some aspects, the polyethylene is present in an amount from 0.05% to 2.75% by weight of the formulation. In some aspects, the polyethylene is present in an amount from 0.05% to 2.70% by weight of the formulation. In some aspects, the polyethylene is present in an amount from 0.05% to 2.65% by weight of the formulation. In some aspects, the polyethylene is present in an amount from 0.05% to 2.60% by weight of the formulation. In some aspects, the polyethylene is present in an amount from 0.05% to 2.55% by weight of the formulation. In some aspects, the polyethylene is present in an amount from 0.05% to 2.50% by weight of the formulation. In some aspects, the polyethylene is present in an amount from 0.05% to 2.45% by weight of the formulation. In some aspects, the polyethylene is present in an amount from 0.05% to 2.40% by weight of the formulation. In some aspects, the polyethylene is present in an amount from 0.05% to 2.35% by weight of the formulation. In some aspects, the polyethylene is present in an amount from 0.05% to 2.30% by weight of the formulation. In some aspects, the polyethylene is present in an amount from 0.05% to 2.25% by weight of the formulation. In some aspects, the polyethylene is present in an amount from 0.05% to 2.20% by weight of the formulation. In some aspects, the polyethylene is present in an amount from 0.05% to 2.15% by weight of the formulation. In some aspects, the polyethylene is present in an amount from 0.05% to 2.10% by weight of the formulation. In some aspects, the polyethylene is present in an amount from 0.05% to 2.05% by weight of the formulation. In some aspects, the polyethylene is present in an amount from 0.05% to 2% by weight of the formulation. In some aspects, the polyethylene is present in an amount from 0.05% to 1.95% by weight of the formulation. In some aspects, the polyethylene is present in an amount from 0.05% to 1.90% by weight of the formulation. In some aspects, the polyethylene is present in an amount from 0.05% to 1.85% by weight of the formulation. In some aspects, the polyethylene is present in an amount from 0.05% to 1.80% by weight of the formulation. In some aspects, the polyethylene is present in an amount from 0.05% to 1.75% by weight of the formulation. In some aspects, the polyethylene is present in an amount from 0.05% to 1.70% by weight of the formulation. In some aspects, the polyethylene is present in an amount from 0.05% to 1.65% by weight of the formulation. In some aspects, the polyethylene is present in an amount from 0.05% to 1.60% by weight of the formulation. In some aspects, the polyethylene is present in an amount from 0.05% to 1.55% by weight of the formulation. In some aspects, the polyethylene is present in an amount from 0.05% to 1.50% by weight of the formulation. In some aspects, the polyethylene is present in an amount from 0.05% to 1.45% by weight of the formulation. In some aspects, the polyethylene is present in an amount from 0.05% to 1.40% by weight of the formulation. In some aspects, the polyethylene is present in an amount from 0.05% to 1.35% by weight of the formulation. In some aspects, the polyethylene is present in an amount from 0.05% to 1.30% by weight of the formulation. In some aspects, the polyethylene is present in an amount from 0.05% to 1.25% by weight of the formulation. In some aspects, the polyethylene is present in an amount from 0.05% to 1.20% by weight of the formulation. In some aspects, the polyethylene is present in an amount from 0.05% to 1.15% by weight of the formulation. In some aspects, the polyethylene is present in an amount from 0.05% to 1.10% by weight of the formulation. In some aspects, the polyethylene is present in an amount from 0.05% to 1.05% by weight of the formulation. In some aspects, the polyethylene is present in an amount from 0.05% to 1% by weight of the formulation. In some aspects, the polyethylene is present in an amount from 0.05% to 0.95% by weight of the formulation. In some aspects, the polyethylene is present in an amount from 0.05% to 0.90% by weight of the formulation. In some aspects, the polyethylene is present in an amount from 0.05% to 0.85% by weight of the formulation. In some aspects, the polyethylene is present in an amount from 0.05% to 0.80% by weight of the formulation. In some aspects, the polyethylene is present in an amount from 0.05% to 0.75% by weight of the formulation. In some aspects, the polyethylene is present in an amount from 0.05% to 0.70% by weight of the formulation. In some aspects, the polyethylene is present in an amount from 0.05% to 0.65% by weight of the formulation. In some aspects, the polyethylene is present in an amount from 0.05% to 0.60% by weight of the formulation. In some aspects, the polyethylene is present in an amount from 0.05% to 0.55% by weight of the formulation. In some aspects, the polyethylene is present in an amount from 0.05% to 0.50% by weight of the formulation. In some aspects, the polyethylene is present in an amount from 0.05% to 0.45% by weight of the formulation. In some aspects, the polyethylene is present in an amount from 0.05% to 0.40% by weight of the formulation. In some aspects, the polyethylene is present in an amount from 0.05% to 0.35% by weight of the formulation. In some aspects, the polyethylene is present in an amount from 0.05% to 0.30% by weight of the formulation. In some aspects, the polyethylene is present in an amount from 0.05% to 0.25% by weight of the formulation. In some aspects, the polyethylene is present in an amount from 0.05% to 0.20% by weight of the formulation. In some aspects, the polyethylene is present in an amount from 0.05% to 0.15% by weight of the formulation. In some aspects, the polyethylene is present in an amount from 0.05% to 0.10% by weight of the formulation.

In some aspects, the polyethylene is present in an amount from 0.1% to 5% by weight of the formulation. In some aspects, the polyethylene is present in an amount from 0.15% to 5% by weight of the formulation. In some aspects, the polyethylene is present in an amount from 0.2% to 5% by weight of the formulation. In some aspects, the polyethylene is present in an amount from 0.25% to 5% by weight of the formulation. In some aspects, the polyethylene is present in an amount from 0.3% to 5% by weight of the formulation. In some aspects, the polyethylene is present in an amount from 0.35% to 5% by weight of the formulation. In some aspects, the polyethylene is present in an amount from 0.4% to 5% by weight of the formulation. In some aspects, the polyethylene is present in an amount from 0.45% to 5% by weight of the formulation. In some aspects, the polyethylene is present in an amount from 0.5% to 5% by weight of the formulation. In some aspects, the polyethylene is present in an amount from 0.55% to 5% by weight of the formulation. In some aspects, the polyethylene is present in an amount from 0.6% to 5% by weight of the formulation. In some aspects, the polyethylene is present in an amount from 0.65% to 5% by weight of the formulation. In some aspects, the polyethylene is present in an amount from 0.7% to 5% by weight of the formulation. In some aspects, the polyethylene is present in an amount from 0.75% to 5% by weight of the formulation. In some aspects, the polyethylene is present in an amount from 0.8% to 5% by weight of the formulation. In some aspects, the polyethylene is present in an amount from 0.85% to 5% by weight of the formulation. In some aspects, the polyethylene is present in an amount from 0.9% to 5% by weight of the formulation. In some aspects, the polyethylene is present in an amount from 0.95% to 5% by weight of the formulation. In some aspects, the polyethylene is present in an amount from 1% to 5% by weight of the formulation. In some aspects, the polyethylene is present in an amount from 1.05% to 5% by weight of the formulation. In some aspects, the polyethylene is present in an amount from 1.1% to 5% by weight of the formulation. In some aspects, the polyethylene is present in an amount from 1.15% to 5% by weight of the formulation. In some aspects, the polyethylene is present in an amount from 1.2% to 5% by weight of the formulation. In some aspects, the polyethylene is present in an amount from 1.25% to 5% by weight of the formulation. In some aspects, the polyethylene is present in an amount from 1.3% to 5% by weight of the formulation. In some aspects, the polyethylene is present in an amount from 1.35% to 5% by weight of the formulation. In some aspects, the polyethylene is present in an amount from 1.4% to 5% by weight of the formulation. In some aspects, the polyethylene is present in an amount from 1.45% to 5% by weight of the formulation. In some aspects, the polyethylene is present in an amount from 1.5% to 5% by weight of the formulation. In some aspects, the polyethylene is present in an amount from 1.55% to 5% by weight of the formulation. In some aspects, the polyethylene is present in an amount from 1.6% to 5% by weight of the formulation. In some aspects, the polyethylene is present in an amount from 1.65% to 5% by weight of the formulation. In some aspects, the polyethylene is present in an amount from 1.7% to 5% by weight of the formulation. In some aspects, the polyethylene is present in an amount from 1.75% to 5% by weight of the formulation. In some aspects, the polyethylene is present in an amount from 1.8% to 5% by weight of the formulation. In some aspects, the polyethylene is present in an amount from 1.85% to 5% by weight of the formulation. In some aspects, the polyethylene is present in an amount from 1.9% to 5% by weight of the formulation. In some aspects, the polyethylene is present in an amount from 1.95% to 5% by weight of the formulation. In some aspects, the polyethylene is present in an amount from 2% to 5% by weight of the formulation. In some aspects, the polyethylene is present in an amount from 2.05% to 5% by weight of the formulation. In some aspects, the polyethylene is present in an amount from 2.1% to 5% by weight of the formulation. In some aspects, the polyethylene is present in an amount from 2.15% to 5% by weight of the formulation. In some aspects, the polyethylene is present in an amount from 2.2% to 5% by weight of the formulation. In some aspects, the polyethylene is present in an amount from 2.25% to 5% by weight of the formulation. In some aspects, the polyethylene is present in an amount from 2.3% to 5% by weight of the formulation. In some aspects, the polyethylene is present in an amount from 2.35% to 5% by weight of the formulation. In some aspects, the polyethylene is present in an amount from 2.4% to 5% by weight of the formulation. In some aspects, the polyethylene is present in an amount from 2.45% to 5% by weight of the formulation. In some aspects, the polyethylene is present in an amount from 2.5% to 5% by weight of the formulation. In some aspects, the polyethylene is present in an amount from 2.55% to 5% by weight of the formulation. In some aspects, the polyethylene is present in an amount from 2.6% to 5% by weight of the formulation. In some aspects, the polyethylene is present in an amount from 2.65% to 5% by weight of the formulation. In some aspects, the polyethylene is present in an amount from 2.7% to 5% by weight of the formulation. In some aspects, the polyethylene is present in an amount from 2.75% to 5% by weight of the formulation. In some aspects, the polyethylene is present in an amount from 2.8% to 5% by weight of the formulation. In some aspects, the polyethylene is present in an amount from 2.85% to 5% by weight of the formulation. In some aspects, the polyethylene is present in an amount from 2.9% to 5% by weight of the formulation. In some aspects, the polyethylene is present in an amount from 2.95% to 5% by weight of the formulation. In some aspects, the polyethylene is present in an amount from 3% to 5% by weight of the formulation. In some aspects, the polyethylene is present in an amount from 3.05% to 5% by weight of the formulation. In some aspects, the polyethylene is present in an amount from 3.1% to 5% by weight of the formulation. In some aspects, the polyethylene is present in an amount from 3.15% to 5% by weight of the formulation. In some aspects, the polyethylene is present in an amount from 3.2% to 5% by weight of the formulation. In some aspects, the polyethylene is present in an amount from 3.25% to 5% by weight of the formulation. In some aspects, the polyethylene is present in an amount from 3.3% to 5% by weight of the formulation. In some aspects, the polyethylene is present in an amount from 3.35% to 5% by weight of the formulation. In some aspects, the polyethylene is present in an amount from 3.4% to 5% by weight of the formulation. In some aspects, the polyethylene is present in an amount from 3.45% to 5% by weight of the formulation. In some aspects, the polyethylene is present in an amount from 3.5% to 5% by weight of the formulation. In some aspects, the polyethylene is present in an amount from 3.55% to 5% by weight of the formulation. In some aspects, the polyethylene is present in an amount from 3.6% to 5% by weight of the formulation. In some aspects, the polyethylene is present in an amount from 3.65% to 5% by weight of the formulation. In some aspects, the polyethylene is present in an amount from 3.7% to 5% by weight of the formulation. In some aspects, the polyethylene is present in an amount from 3.75% to 5% by weight of the formulation. In some aspects, the polyethylene is present in an amount from 3.8% to 5% by weight of the formulation. In some aspects, the polyethylene is present in an amount from 3.85% to 5% by weight of the formulation. In some aspects, the polyethylene is present in an amount from 3.9% to 5% by weight of the formulation. In some aspects, the polyethylene is present in an amount from 3.95% to 5% by weight of the formulation. In some aspects, the polyethylene is present in an amount from 4% to 5% by weight of the formulation. In some aspects, the polyethylene is present in an amount from 4.05% to 5% by weight of the formulation. In some aspects, the polyethylene is present in an amount from 4.1% to 5% by weight of the formulation. In some aspects, the polyethylene is present in an amount from 4.15% to 5% by weight of the formulation. In some aspects, the polyethylene is present in an amount from 4.2% to 5% by weight of the formulation. In some aspects, the polyethylene is present in an amount from 4.25% to 5% by weight of the formulation. In some aspects, the polyethylene is present in an amount from 4.3% to 5% by weight of the formulation. In some aspects, the polyethylene is present in an amount from 4.35% to 5% by weight of the formulation. In some aspects, the polyethylene is present in an amount from 4.4% to 5% by weight of the formulation. In some aspects, the polyethylene is present in an amount from 4.45% to 5% by weight of the formulation. In some aspects, the polyethylene is present in an amount from 4.5% to 5% by weight of the formulation. In some aspects, the polyethylene is present in an amount from 4.55% to 5% by weight of the formulation. In some aspects, the polyethylene is present in an amount from 4.6% to 5% by weight of the formulation. In some aspects, the polyethylene is present in an amount from 4.65% to 5% by weight of the formulation. In some aspects, the polyethylene is present in an amount from 4.7% to 5% by weight of the formulation. In some aspects, the polyethylene is present in an amount from 4.75% to 5% by weight of the formulation. In some aspects, the polyethylene is present in an amount from 4.8% to 5% by weight of the formulation. In some aspects, the polyethylene is present in an amount from 4.85% to 5% by weight of the formulation. In some aspects, the polyethylene is present in an amount from 4.9% to 5% by weight of the formulation. In some aspects, the polyethylene is present in an amount from 4.95% to 5% by weight of the formulation.

In some aspects, the polyethylene is present at 0.05, or 0.1, 0.15, or 0.2, 0.25, or 0.3, 0.35, or 0.4, 0.45, or 0.5, 0.55, or 0.6, 0.65, or 0.7, 0.75, or 0.8, 0.85, or 0.9, 0.95, or 1, or 1.05, or 1.15, or 1.20, or 1.25, or 1.3, or 1.35, or 1.4, or 1.45, or 1.5, or 1.55, or 1.6, or 1.65, or 1.7, or 1.75, or 1.8, or 1.85, or 1.9, or 1.95, or 2, or 2.05, or 2.15, or 2.20, or 2.25, or 2.3, or 2.35, or 2.4, or 2.45, or 2.5, or 2.55, or 2.6, or 2.65, or 2.7, or 2.75, or 2.8, or 2.85, or 2.9, or 2.95, or 3, or 3.05, or 3.15, or 3.20, or 3.25, or 3.3, or 3.35, or 3.4, or 3.45, or 3.5, or 3.55, or 3.6, or 3.65, or 3.7, or 3.75, or 3.8, or 3.85, or 3.9, or 3.95, or 4, or 4.05, or 4.15, or 4.20, or 4.25, or 4.3, or 4.35, or 4.4, or 4.45, or 4.5, or 4.55, or 4.6, or 4.65, or 4.7, or 4.75, or 4.8, or 4.85, or 4.9, or 4.95, or 5% by weight of the wax formulation.

Without intending to be limited to any particular theory, the polyethylene may alter the crystal properties of the paraffin wax. In some aspects, the polyethylene may add surface area to the existing carbon backbone of the paraffin wax. In some embodiments, the increased surface area may result in an increased ability of the wax formulation to retain fragrance oils.

In some aspects, the molecular weight of the polyethylene is from 300 and 2500. In some aspects, the meting point of the polyethylene is from 80 to 160 degrees Celsius.

In some aspects, the polyethylene is the polyethylene sold under the trade name POLYWAX 500.

In some aspects, the polyethylene is polyethylene glycol. In some aspects, the polyethylene glycol has an average molecular weight of 400. In some aspects, the polyethylene glycol is the polyethylene glycol sold under the trade name CARBOWAX 400.

In some aspects, the at least one microcrystalline wax is present in an amount from 0.1% to 5% by weight of the formulation. In some aspects, the at least one microcrystalline wax is present in an amount from 0.2% to 5% by weight of the formulation. In some aspects, the at least one microcrystalline wax is present in an amount from 0.3% to 5% by weight of the formulation. In some aspects, the at least one microcrystalline wax is present in an amount from 0.4% to 5% by weight of the formulation. In some aspects, the at least one microcrystalline wax is present in an amount from 0.5% to 5% by weight of the formulation. In some aspects, the at least one microcrystalline wax is present in an amount from 0.6% to 5% by weight of the formulation. In some aspects, the at least one microcrystalline wax is present in an amount from 0.7% to 5% by weight of the formulation. In some aspects, the at least one microcrystalline wax is present in an amount from 0.8% to 5% by weight of the formulation. In some aspects, the at least one microcrystalline wax is present in an amount from 0.9% to 5% by weight of the formulation. In some aspects, the at least one microcrystalline wax is present in an amount from 1% to 5% by weight of the formulation. In some aspects, the at least one microcrystalline wax is present in an amount from 1.5% to 5% by weight of the formulation. In some aspects, the at least one microcrystalline wax is present in an amount from 2% to 5% by weight of the formulation. In some aspects, the at least one microcrystalline wax is present in an amount from 2.5% to 5% by weight of the formulation. In some aspects, the at least one microcrystalline wax is present in an amount from 3% to 5% by weight of the formulation. In some aspects, the at least one microcrystalline wax is present in an amount from 3.5% to 5% by weight of the formulation. In some aspects, the at least one microcrystalline wax is present in an amount from 4% to 5% by weight of the formulation. In some aspects, the at least one microcrystalline wax is present in an amount from 4.5% to 5% by weight of the formulation. In some aspects, the at least one microcrystalline wax is present in an amount from 0.1% to 4.5% by weight of the formulation. In some aspects, the at least one microcrystalline wax is present in an amount from 0.1% to 4% by weight of the formulation. In some aspects, the at least one microcrystalline wax is present in an amount from 0.1% to 3.5% by weight of the formulation. In some aspects, the at least one microcrystalline wax is present in an amount from 0.1% to 3% by weight of the formulation. In some aspects, the at least one microcrystalline wax is present in an amount from 0.1% to 2.5% by weight of the formulation. In some aspects, the at least one microcrystalline wax is present in an amount from 0.1% to 2% by weight of the formulation. In some aspects, the at least one microcrystalline wax is present in an amount from 0.1% to 1.5% by weight of the formulation. In some aspects, the at least one microcrystalline wax is present in an amount from 0.1% to 1% by weight of the formulation. In some aspects, the at least one microcrystalline wax is present in an amount from 0.1% to 0.5% by weight of the formulation. In some aspects, the at least one microcrystalline wax is present in an amount from 0.1% to 0.4% by weight of the formulation. In some aspects, the at least one microcrystalline wax is present in an amount from 0.1% to 0.3% by weight of the formulation. In some aspects, the at least one microcrystalline wax is present in an amount from 0.1% to 0.2% by weight of the formulation.

In some aspects, the at least one microcrystalline wax is present in an amount from 0.1% to 4.5% by weight of the formulation. In some aspects, the at least one microcrystalline wax is present in an amount from 0.1% to 4% by weight of the formulation. In some aspects, the at least one microcrystalline wax is present in an amount from 0.1% to 3.5% by weight of the formulation. In some aspects, the at least one microcrystalline wax is present in an amount from 0.1% to 2% by weight of the formulation. In some aspects, the at least one microcrystalline wax is present in an amount from 0.1% to 2.5% by weight of the formulation. In some aspects, the at least one microcrystalline wax is present in an amount from 0.1% to 2% by weight of the formulation. In some aspects, the at least one microcrystalline wax is present in an amount from 0.1% to 1.5% by weight of the formulation. In some aspects, the at least one microcrystalline wax is present in an amount from 0.1% to 1% by weight of the formulation. In some aspects, the at least one microcrystalline wax is present in an amount from 0.1% to 0.5% by weight of the formulation. In some aspects, the at least one microcrystalline wax is present in an amount from 0.1% to 0.4% by weight of the formulation. In some aspects, the at least one microcrystalline wax is present in an amount from 0.1% to 0.3% by weight of the formulation. In some aspects, the at least one microcrystalline wax is present in an amount from 0.1% to 0.2% by weight of the formulation.

In some aspects, the at least one microcrystalline wax is present at 0.1, or 0.2, or 0.3, or 0.4, or 0.5, or 1, or 1.5, or 2, or 2.5, or 3, or 3.5, or 4, or 4.5, or 5% by weight of the wax formulation.

The microcrystalline wax may be obtained via crude oil distillation. In some aspects, the microcrystalline wax comprises a mixture of saturated hydrocarbons, with chain length distribution ranging from $C_{25-80}$. The microcrystalline wax may contain branched isoalkanes and alkyl-substituted cycloalkanes (Naphthenes). Without intending to be limited to any particular theory, the microcrystalline wax may increase the hardness and the melt point of the wax formulation. Additionally, the microcrystalline wax may increase the flexibility and oil binding capacity of the wax formulation, allowing the wax formulation to hold more fragrance oil.

In some aspects, the at least one linear alcohol is present in an amount from 0.1% to 0.6% w/w of the wax formulation. In some aspects, the at least one linear alcohol is present in an amount from 0.01% to 25% w/w of the wax formulation. Alternatively, the at least one linear alcohol is present in an amount from 0.1% to 5% w/w of the wax formulation. Alternatively, the at least one linear alcohol is present in an amount from 0.15% to 5% w/w of the wax formulation. Alternatively, the at least one linear alcohol is present in an amount from 0.1% to 0.6% w/w of the wax formulation.

In some aspects, the at least one linear alcohol is present at 25% w/w of the wax formulation. Alternatively, the at least one linear alcohol is present at 24, or 23, or 22, or 21, or 20, or 15, or 10, or 5, or 1, or 0.9, or 0.8, or 0.7, or 0.6, or 0.5, or 0.4, or 0.3, or 0.2, or 0.1, or 0.09, or 0.08, or 0.07, or 0.06, or 0.05, or 0.04, or 0.03, or 0.02, or 0.01, or 0.005, or 0.001% w/w of the wax formulation.

Examples of the at least one linear alcohol include the high molecular weight linear primary alcohol sold under the trade name UNILIN™. In some aspects, the at least one linear alcohol is the high molecular weight linear primary alcohol sold under the trade name UNILIN™ 550. In some aspects, the at least one linear alcohol is the high molecular weight linear primary alcohol sold under the trade name UNILIN™ 700. In some aspects, the at least one linear alcohol is the high molecular weight linear primary alcohol sold under the trade name UNILIN™ 1000.

In some aspects, the at least one linear alcohol improves the dispersion of the volatile active substance by disrupting the crystal packing of a wax formulation, by opening the interstitial space between wax crystals, thereby allowing the volatile active substance to infiltrate uniformly between the wax crystals.

In some aspects, the wax formulation may further comprise polyhydric alcohols. Without intending to be limited to any particular theory, the polyhydric alcohol may further enable the wax formulation to pull away from an inner surface of a vessel when the candle cools below the melting point of the wax formulation after the burning stops.

In some aspects, the wax formulation may further comprise additional compounds that enable the wax formulation to pull away from an inner surface of a vessel when the candle cools below the melting point of the wax formulation after the burning stops. Examples include, but are not limited to propylene glycol, vegetable glycerin, dipropylene glycol, dimethyl polysiloxanes, methyl phenyl polysiloxanes, water soluble silicone glycol copolymers, and alcohol soluble silicone glycol copolymers.

In some aspects, the wax formulation may further comprise additional optional ingredients to provide enhanced or additional aesthetic and/or functional improvements. In particular, the additional materials that may be included in the wax formulation include coloring agents, decorative materials, solvents, stabilizers, antioxidants, and UV blockers. Such optional ingredients do not warrant a more detailed description here, which would in any case not be exhaustive. The skilled person is capable to select them on the basis of his general knowledge and the desired characteristics of the candle. In particular, the kind and amount of the additional ingredients are selected among those that do not alter the structure or the burning properties of the wax formulation.

The volatile active substance may be any type of volatile active substance. In some aspects it is a perfume, a malodor counteractant, an antibacterial agent, an insect repellent or any combination thereof. In some aspects, the volatile active substance is a perfume.

As used herein, the term "perfume" is meant as including any perfuming ingredient or a mixture thereof. A "perfuming ingredient" is meant here as a compound which is of current use in the perfumery industry, i.e. a compound which is used as active ingredient in perfumed candles in order to impart a hedonic effect into its surrounding. In other words, such an ingredient or mixture, to be considered as being a perfuming one, must be recognized by a person skilled in the art of perfumery as being able to impart or modify in a positive or pleasant way the odor of a candle, and not just as having an odor. Moreover, this definition is also meant to include compounds that do not necessarily have an odor but are capable of modulating the odor of a perfuming composition and, as a result, of modifying the perception by a user of the odor of such a composition.

The nature and type of these perfuming ingredients do not warrant a more detailed description here, which in any case would not be exhaustive, the skilled person being able to select them on the basis of his general knowledge, the intended use or application and the desired organoleptic effect. In general terms, these perfuming ingredients belong to chemical classes as varied as alcohols, aldehydes, ketones, esters, ethers, acetates, nitriles, terpene hydrocarbons, nitrogenous or sulphurous heterocyclic compounds and essential oils, and said perfuming ingredients can be of natural or synthetic origin. Many of these ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

By the term "malodor counteractant" or "malodor counteracting ingredient" is meant compounds which are capable of reducing the perception of malodor, i.e. of an odor that is unpleasant or offensive to the human nose by counteracting and/or masking malodors. In a particular aspects, malodor counteractants have the ability to react with key compounds causing known malodors. The reactions result in reduction of the malodor materials' airborne levels and consequent reduction in the perception of the malodor.

Non-limiting examples of suitable insect repellants include citronella, dimethyl phthalate and n,n-dimethyl-m-toluamide.

The volatile active substance is typically present in candle between 10 and 25% by weight, based on the total weight of the composition.

In general, known methods for manufacturing candles can be used to provide the candles disclosed herein. In some aspects, high melting point wax coated wicks are cut into a desired length then crimped into small metal wick stands. The wick stands are attached to the bottom of a container. On top of the container, a metal wick guide is placed to keep the wicks vertical. The wax formulation is poured into the container to the desired level. The candle is cooled to room temperature, followed by removal of the metal wick guide. Optionally, an accelerated cooling process can be used. The wicks are trimmed to right length to yield a finished candle. Other approaches, including those common in the industry, may be used.

One aspect presented herein, provides a method comprising:

a) admixing a paraffin wax, a stearic acid, a polyethylene, at least one microcrystalline wax, at least one linear alcohol, and a volatile active substance, thereby forming a formulation; and b) forming a candle from the formulation, wherein the polyethylene is present in the formulation in an amount sufficient to enable the formulation to pull away from an inner surface of the vessel when the candle cools below the melting point of the formulation after the burning stops, and wherein the at least one microcrystalline wax is present in the formulation in an amount sufficient to enable the formulation to pull away from an inner surface of the vessel when the candle cools below the melting point of the formulation after the burning stops.

The present invention is best illustrated but is not limited to the following examples.

EXAMPLES

Example 1: Wax Formulations According to Some Aspects Presented Herein

| Ingredient | Amount (w/w of the wax formulation) |
|---|---|
| Paraffin wax 4625A | 79.5 |
| Triple Press Stearic Acid | 14.5 |
| Polywax 500 | 0.5 |
| Fragrance | 5.5 |

| Ingredient | Amount (w/w of the wax formulation) |
|---|---|
| Paraffin wax 4625A | 79.1 |
| Triple Press Stearic Acid | 15.0 |
| Microcrystalline Wax 5910A | 0.2 |
| Polywax 500 | 0.2 |
| Fragrance | 5.5 |

| Ingredient | Amount (w/w of the wax formulation) |
|---|---|
| Paraffin wax 1239A | 79.5 |
| Triple Press Stearic Acid | 15.0 |
| Fragrance | 5.5 |

| Ingredient | Amount (w/w of the wax formulation) |
|---|---|
| Paraffin wax 1239A | 74.1 |
| Triple Press Stearic Acid | 19.8 |
| Polywax 500 | 0.5 |
| Fragrance | 5.5 |
| Unilin 700 | 0.2 |

| Ingredient | Amount (w/w of the wax formulation) |
|---|---|
| Paraffin wax 1239A | 84.1 |
| Triple Press Stearic Acid | 10.0 |
| Polywax 500 | 0.5 |
| Fragrance | 5.5 |

| Ingredient | Amount (w/w of the wax formulation) |
|---|---|
| Paraffin wax 1239A | 46.5 |
| Triple Press Stearic Acid | 46.5 |
| PEG 400 | 2.0 |
| Fragrance | 5.0 |

| Ingredient | Amount (w/w of the wax formulation) |
|---|---|
| Soy wax | 46.0 |
| Stearic Acid | 46.0 |
| PEG 400 | 3.0 |
| Fragrance | 5.0 |

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

The invention claimed is:

1. A wax formulation, comprising:

a. a paraffin wax;

b. a stearic acid;

c. a polyethylene, d. at least one microcrystalline wax;

e. at least one linear alcohol; and f. a volatile active substance;

wherein the at least one linear alcohol is present in an amount from 0.01% to 0.20% w/w of the wax formulation, wherein the polyethylene is present in an amount from 2% to 5% by weight of the wax formulation, and wherein the at least one microcrystalline wax is present in an amount from 0.1% to 0.4% by weight of the wax formulation.

2. The wax formulation of claim 1, wherein the paraffin wax is present in an amount from 50% to 95% by weight of the wax formulation.

3. The wax formulation of claim 1, wherein the stearic acid is present in an amount from 5% to 20% by weight of the wax formulation.

4. A candle comprising the wax formulation of claim 1 and a vessel, wherein the candle is located within the vessel, and wherein the wax formulation is solid at room temperature, and a portion of the wax formulation undergoes a phase change from solid to liquid when the candle is burnt, and the temperature of the candle increases above the melting point of the wax formulation, wherein the portion of the wax formulation that is liquid, undergoes a phase change from liquid to solid when the candle cools below the melting point of the wax formulation after the burning stops, wherein either the at least one microcrystalline wax, or the polyethylene, or both the at least one microcrystalline wax and the polyethylene is present in the wax formulation in an amount sufficient to enable the wax formulation to pull away from an inner surface of the vessel when the candle cools below the melting point of the wax formulation after the burning stops.

5. A method, comprising:

a. admixing a paraffin wax, a stearic acid, a polyethylene, at least one microcrystalline wax, at least one linear alcohol, and a volatile active substance, thereby forming a wax formulation, wherein the at least one linear alcohol is present in an amount from 0.01% to 0.20% w/w of the wax formulation; and b. forming a candle from the wax formulation, wherein the polyethylene is present in the wax formulation in an amount sufficient to enable the wax formulation to pull away from an inner surface of the vessel when the candle cools below the melting point of the wax formulation after the burning stops, and wherein the at least one microcrystalline wax is present in the wax formulation in an amount sufficient to enable the wax formulation to pull away from an inner surface of the vessel when the candle cools below the melting point of the wax formulation after the burning stops;

wherein the sufficient amount of the polyethylene is from 2% to 5% by weight of the wax formulation; and wherein the sufficient amount of the at least one microcrystalline wax is from 0.1% to 0.4% by weight of the wax formulation.

6. The method of claim 5, wherein the paraffin wax is present in an amount from 50% to 95% by weight of the wax formulation.

7. The wax formulation of claim 1, wherein the polyethylene is polyethylene glycol.

8. The wax formulation of claim 1, further comprising a polyhydric alcohol.

* * * * *